United States Patent
Le Sage

(10) Patent No.: US 8,634,823 B2
(45) Date of Patent: Jan. 21, 2014

(54) RETROFIT INLINE ANTENNA POWER MONITOR SYSTEM AND METHOD

(76) Inventor: Hendrikus A. Le Sage, Sprang-Capelle (NL)

( * ) Notice: Subject to any disclaimer, the term of this patent is extended or adjusted under 35 U.S.C. 154(b) by 251 days.

(21) Appl. No.: 13/150,828

(22) Filed: Jun. 1, 2011

(65) Prior Publication Data

US 2011/0294498 A1    Dec. 1, 2011

Related U.S. Application Data

(60) Provisional application No. 61/350,313, filed on Jun. 1, 2010.

(51) Int. Cl.
*H04W 24/00* (2009.01)

(52) U.S. Cl.
USPC ............... 455/423; 455/67.11; 455/562.1

(58) Field of Classification Search
USPC .............. 324/520, 530, 750.12; 455/73, 423, 455/562.1, 561, 67.11
See application file for complete search history.

(56) References Cited

U.S. PATENT DOCUMENTS

| | | | | |
|---|---|---|---|---|
| 5,423,081 A | * | 6/1995 | Thiele et al. | 455/116 |
| 6,006,089 A | * | 12/1999 | Sasaki et al. | 455/423 |
| 6,954,620 B2 | | 10/2005 | Rotta et al. | |
| 7,652,632 B2 | * | 1/2010 | Shtrom | 343/795 |
| 2008/0291116 A1 | * | 11/2008 | Le et al. | 343/907 |

OTHER PUBLICATIONS

Antenna Interface Standards Group Standard No. AISG v2.0 (release date Jun. 13, 2006) pp. 11-12.*
3GPP TS 25.461 "Technical Specification Group Radio Access Network; UTRAN Iuant interface: Layer 1," V9.2.0 (Mar. 2010).*
Anritsu Company, "MA24104A Inline High Power Sensor", http://www.anritsu.com/en-US/Downloads/Brochures-Datasheets-and-Catalogs/Brochure/DWL3585.aspx, (2009).
Rohde & Schwarz, "RF monitoring and protection system for broadcast antennas", http://www2.rohde-schwarz.com/file_17522/TS4506_NRP-Zxx_RF_monitoring_ac_en.pdf, (2009 (updated Feb. 2012)).
Tasc Systems Inc., "Antenna/Line Monitor Product Information", http://tascsystems.com/images/TASC_ALM_10_P_W.pdf, (2009).

* cited by examiner

*Primary Examiner* — Lewis West
(74) *Attorney, Agent, or Firm* — Law Office of Mark Brown, LLC; Mark E. Brown; Christopher M. DeBacker

(57) ABSTRACT

A system and method for measuring and monitoring the transmitted power from cellular antennas, and reporting the measurement over AISG protocol back to the user. The device associated with this system and method is capable of retrofitting existing telecommunications antennas currently in use by connecting directly in-line with an AISG communication cable already interfaced with the antenna. The system will monitor the broadcast power level of the antenna and may optionally be set to provide the user with alerts when the power levels are not within ideal parameters.

14 Claims, 2 Drawing Sheets

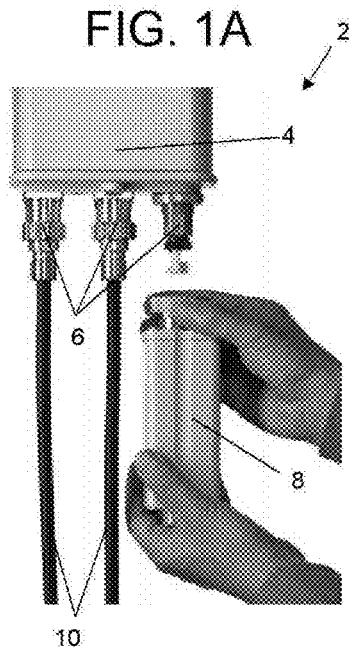
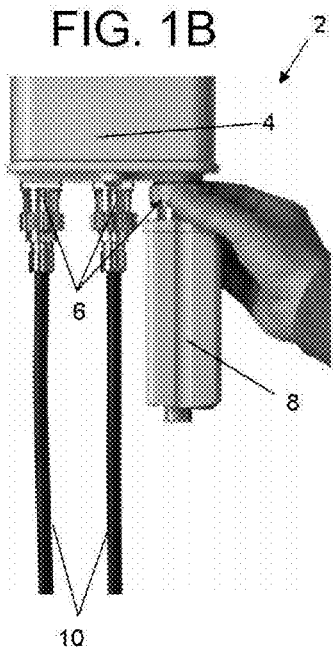
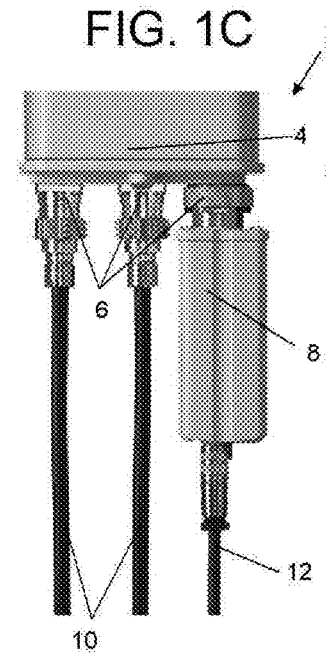
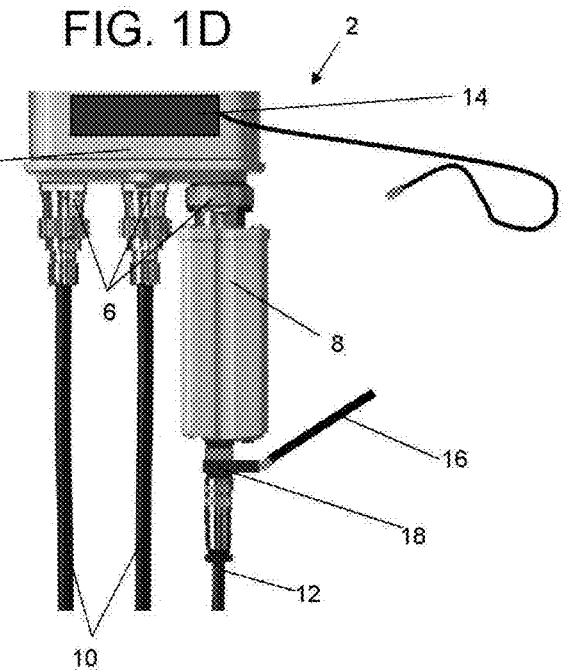

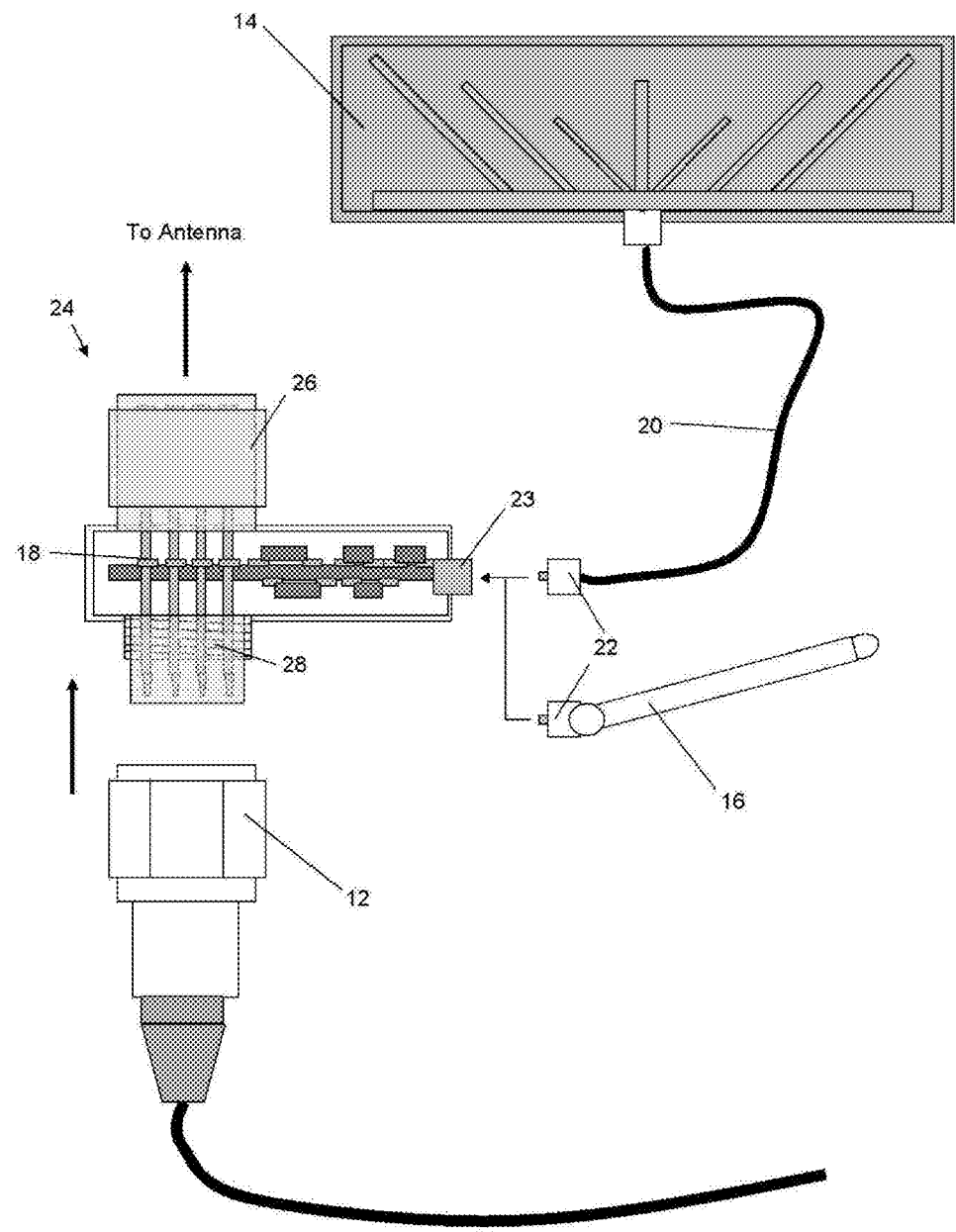

RETROFIT INLINE ANTENNA POWER MONITOR SYSTEM AND METHOD

CROSS-REFERENCE TO RELATED APPLICATION

This application claims priority in and incorporates by reference U.S. patent application Ser. No. 61/350,313, filed Jun. 1, 2010.

BACKGROUND OF THE INVENTION

1. Field of the Invention

The present invention relates generally to a system and method for measuring and monitoring the transmitted power from cellular antennas and reporting that measurement over AISG protocol to the user at a remote location. The monitor is retrofit into existing cellular antennas and is capable of connecting directly inline with existing signal lines, saving valuable interface ports on the antenna.

2. Description of the Related Art

Telecommunications antennas operate at a wide variety of bandwidths, and a wide variety of transmittal power is needed depending on the particular bandwidths being transmitted by an antenna. These bands include but are not limited to CDMA, GSM, DCS, UMTS, WIMAX on 750 MHz, 850 MHz, 960 Mhz and 1800/1990 Mhz and 2100 MHz frequencies. In certain applications, it is important to be able to measure this power output in order to determine whether the antenna is functioning correctly and delivering the proper signals at the proper bandwidths.

It is not uncommon for new telecommunications antennas to include power monitoring hardware built into the antenna itself. However, antennas that have been in use for some years may not have such hardware built into them. Additionally, not all new antennas will include such built-in hardware, because not all usages of the antenna will require power metering and monitoring. Therefore, it is important to be able to retrofit a metering device onto the antenna in the field for remote monitoring.

Modern telecommunications antennas are built with additional interface ports for connecting signal monitoring or boosting devices, or other devices used in connection with the antenna. Because of this, it is important that a retrofit device be universally adaptable, while not taking up a valuable interface port when there are none to spare. Groups have begun to standardize telecommunications antenna interface protocols. One such group is the Antenna Interface Standards Group (AISG). The AISG protocol provides 3 possible standards at this moment: (1) V2.0 for RET and TMA; (2) provisional released AAS specification; and (3) under process CAD specification. A retrofit power monitoring device capable of interfacing with these standard interface protocols would be nearly universally usable in the field of telecommunications antenna monitoring.

SUMMARY OF THE INVENTION

It is an object of the present invention to provide a system and method for measuring and monitoring the transmitted power from cellular antennas, and reporting the measurement over AISG protocol back to the user. The device associated with this system and method is capable of retrofitting existing telecommunications antennas currently in use by connecting directly in-line with an AISG communication cable already interfaced with the antenna. The system will monitor the broadcast power level of the antenna and may optionally be set to provide the user with alerts when the power levels are not within ideal parameters.

Once installed, the carrier can immediately measure whether the installed antenna on site is really transmitting, how much data is being transmitted, and in which band. The system can also monitor and trigger an alarm to inform the user if the antenna is passing specified power thresholds.

BRIEF DESCRIPTION OF THE DRAWINGS

In the accompanying drawings, which illustrate the principles of the present invention and an exemplary embodiment thereof:

FIG. 1A is an elevation view of an antenna, wherein a retrofit monitor controller is shown being brought to the antenna interface.

FIG. 1B is an elevation view of an antenna, wherein the retrofit monitor controller is manually being connected to the antenna interface port.

FIG. 1C is an elevation view of an antenna, wherein the retrofit monitor controller is shown inserted inline with an existing AISG communication line.

FIG. 1D shows an alternative embodiment elevation view of an antenna, wherein the retrofit monitor controller is shown inserted inline with an existing AISG communication line, and additional communication antennas are included.

FIG. 2 is an elevation view of a retrofit monitor controller system demonstrating how the optional communication antennas connect to the system.

DETAILED DESCRIPTION OF THE PREFERRED EMBODIMENTS

I. Introduction and Environment

As required, detailed aspects of the disclosed subject matter are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. Said terminology will include the words specifically mentioned, derivatives thereof and words of similar meaning.

The included embodiments of the present invention are typically mentioned with reference to a cellular transmission antenna. The preferred embodiment of the present invention is a retrofit to a common cellular transmission antenna, but the device could be built into the antenna during manufacture. Other aspects of the preferred embodiment are mentioned as an example to demonstrate the practice of this invention, and not to limit the use of the invention in any manner.

II. Embodiment of a Retrofit Inline Antenna Power Monitor System and Method

An embodiment of a retrofit inline antenna power monitor system (Ri-APM) 2 is a miniature sensor consisting of a RF shielded housing with one or more male 28 and female 26 AISG connectors and a internal printed circuit board (PCB) with selectable antenna array, power detectors, band pass filters, A/D convertor, microcontroller, and AISG protocol transceiver suited for the operational transmitting (downlink)

bands the global mobile network carriers are using. These bands include but not limited to CDMA, GSM, DCS, UMTS, WIMAX on 750 MHz, 850 MHz, 960 Mhz and 1800/1990 Mhz and 2100 MHz frequencies.

Equipped with carrier specific band pass filters, the Ri-APM 2 filters the multiple carrier frequencies and divides the measured transmitted power from the cellular antenna 4 into one or more digital signal levels representing a level of the power measured. This information is then converted into the AISG specific protocol formats and transmitted down the tower to the AISG Master device (Primary controller).

The Ri-APM 2 can be configured and updated after installation using the AISG standards protocol to operate on the existing wiring and power supplies without needing additional wires or power supplies. The Ri-APM 2 is configured to reside indefinitely connected to the antenna protocol interface 6. Because most cellular antennas 4 have a limited number of interface connections 6 and most are taken up by antenna communication cables 10, the Ri-APM 2 is designed to connect inline with an existing connection, such as an existing AISG communication cable 12.

FIGS. 1A-1C demonstrate how a Ri-APM unit 8 is connected to an antenna 4 inline with an existing AISG communication cable 12. The female end 26 of the Ri-APM unit 8 connects to the interface 6 of the antenna 4, and the male end 28 of the Ri-APM unit 8 connects to the existing AISG communication cable 12. An antenna power monitor module 18 located within the Ri-APM unit 8 splits signal coming up or down the AISG communication line 12 and thus monitors the power of the broadcast signal delivered by the antenna.

FIGS. 1D and 2 show the connection of a removable receiving antenna 16 or optional stick-on receiving x poll antenna 14 to the antenna power monitor module 18 included within an inline cable splitter 24 including an RF port 23. An RF connector 22 and matching RF port 23 allows the Ri-APM unit 8 to interface with a number of different antennas for different purposes. For example, a stick-on receiving x poll antenna 14, including an adhesive face and a rf cable 20, can be made almost invisible when attached to the antenna 4, and can be designed to work on all frequencies and at the same time receive horizontal, vertical and cross polarized antenna signals. Further, the stick-on antenna 14 would be more secure than a standard antenna, and the transmitted signals can be calibrated as the receiving antenna is always exactly in the same RF path.

FIGS. 1D and 2 also show a removable receiving antenna 16, which would connect to the antenna power monitor module 18 in the typical embodiment. This removable antenna 16 can be fine tuned for specific operating frequencies making it more flexible in usage than a standard integrated antenna.

The Ri-APM 2 can support multiple buss structures to report the measured power to multiple base stations. The Ri-APM system 2 can support both MTS and AIM sensor systems. MTS measures the antenna 4 tilt and roll, whereas AIM is a module for identifying the type of antenna. MTS, AIM, and Ri-APM 2 all use the same single and multiple AISG signaling protocol.

It is to be understood that while certain aspects of the disclosed subject matter have been shown and described, the disclosed subject matter is not limited thereto and encompasses various other embodiments and aspects.

Having thus described the disclosed subject matter, what is claimed as new and desired to be secured by Letters Patent is:

1. A monitoring system for measuring the signal output of a cellular antenna including an AISG protocol interface and an AISG communication line, the system comprising:
    an antenna power monitor module being configured for receiving and measuring the broadcast signal power of a standard cellular antenna;
    a printed circuit board (PCB) being configured for filtering signal frequencies and dividing said measured broadcast signal power from the cellular antenna into at least one digital signal level based on the measured power;
    an RF shielded housing being configured for enclosing said module and said PCB, the housing comprising a distal end having a male AISG connector and a proximal end having a female AISG connector;
    said antenna power monitor module mounted in-line with said AISG protocol interface and perpendicular to the antenna;
    an AISG communications cable connected to said female AISG connector, wherein said AISG communications cable provides at least two measurements to at least two remote locations; and
    wherein one of said at least two measurements is the broadcast signal power from said cellular antenna.

2. The system of claim 1, wherein said monitoring system is retrofitted into an existing cellular antenna structure.

3. The system of claim 1, wherein said PCB further comprises:
    a selectable antenna array;
    at least one power detector;
    at least one band pass filters;
    an A/D convertor;
    a microcontroller; and
    an AISG protocol transceiver.

4. The system of claim 3, wherein said band pass filter is configured for a predetermined carrier frequency.

5. The system of claim 1, further comprising:
    a removable receiving antenna including an RF connector, said removable antenna being configured to receive a predetermined carrier frequency;
    said removable receiving antenna located externally from a housing of said cellular antenna;
    said removable receiving antenna being configured for connecting to said antenna power monitor module along the AISG communications line via an RF port connected to said PCB; and
    said removable receiving antenna being further configured for receiving horizontal, vertical, and cross-polarized antenna signals.

6. The system of claim 5, wherein said removeable receiving antenna comprises a stick-on x poll antenna including:
    an adhesive face being configured for attaching to the housing of said antenna power monitoring system; and
    an RF cable being configured to connect said stick-on x poll antenna with said inline cable splitter.

7. A retrofit monitoring system for measuring the signal output of a cellular antenna including an AISG protocol interface and an AISG communication line, the system comprising:
    an antenna power monitor module being configured for receiving and measuring the broadcast signal power of a standard cellular antenna;
    an RF shielded housing being configured for enclosing said module and said PCB, the housing comprising a distal end having a male AISG connector and a proximal end having a female AISG connector;
    a printed circuit board (PCB) being configured for filtering signal frequencies and dividing said measured broadcast signal power from the cellular antenna into at least one digital signal level based on the measured power, said PCB including a selectable antenna array, at least one power detector, at least one band pass filters configured for a predetermined carrier frequency, an A/D convertor, a microcontroller, and an AISG protocol transceiver;

said antenna power monitor module mounted in-line with said AISG protocol interface and perpendicular to the antenna;

an AISG communications cable connected to said female AISG connector, wherein said AISG communications cable provides at least two measurements to at least two remote locations;

wherein one of said at least two measurements is the broadcast signal power from said cellular antenna;

a removable receiving antenna including an RF connector;

said removable receiving antenna being configured for connecting to said antenna power monitor module along the AISG communications line via an RF port connected to said PCB; and said removable receiving antenna being further configured for receiving horizontal, vertical, and cross-polarized antenna signals.

8. The system of claim 7, wherein said removeable receiving antenna comprises a stick-on x poll antenna including:

an adhesive face being configured for attaching to the housing of said antenna power monitoring system; and an RF cable being configured to connect said stick-on x poll antenna with said inline cable splitter.

9. A method of retrofitting a cellular antenna including an AISG protocol interface and an AISG communication line with a monitoring system for measuring the cellular antenna's signal output, comprising the steps:

providing an antenna power monitor module configured for receiving and measuring the broadcast signal power of a standard cellular antenna;

providing a PCB configured for filtering signal frequencies and dividing said measured broadcast signal power from the cellular antenna into at least one digital signal level based on the measured power;

providing an RF shielded housing around said antenna power monitor module and said PCB, said housing including at least one male AISG connector and at least one female AISG connector;

mounting said housing in-line with said AISG protocol interface and perpendicular to the antenna via said male AISG connector, and connecting the existing AISG communication line via said female AISG connector;

splitting signal traveling along said AISG communication line with said antenna power monitor module;

monitoring the broadcast power of said cellular antenna with said antenna power monitor module; and transmitting at least two reports to at least two remote locations, wherein one of said at least two measurements is a report from said antenna power monitor module.

10. The method of claim 9, wherein said PCB comprises:
a selectable antenna array;
at least one power detector;
at least one band pass filters;
an A/D convertor;
a microcontroller; and
an AISG protocol transceiver.

11. The method of claim 10, further comprising the step:
configuring said AISG protocol transceiver for operational transmission of CDMA, GSM, DCS, UMTS, and WIMAX bands on 750 MHz, 850 MHz, 960 Mhz, 1800/1990 Mhz and 2100 MHz frequencies.

12. The method of claim 10, further comprising the step:
configuring said band pass filter for a predetermined carrier frequency.

13. The method of claim 9, further comprising the steps:
providing a removable antenna including an RF connector, said removable antenna being configured to receive a predetermined carrier frequency;

providing an in-line cable splitter including an RF port and connecting said cable splitter to said RF shielded housing along said AISG communications line;

connecting said removable antenna RF connector to said cable splitter RF port; and receiving horizontal, vertical, and cross-polarized antenna signals using said removable antenna.

14. The method of claim 9 wherein said removable antenna comprises a stick-on x poll antenna, further comprising the steps:

providing an adhesive face to said removable antenna; and
attaching said removable antenna to said RF shielded housing said adhesive face.

* * * * *